Dec. 26, 1961 M. E. TRUE ET AL 3,014,362
VOLUMETRIC MEASUREMENT OF FLUIDS
Filed April 6, 1959 2 Sheets-Sheet 1

INVENTORS.
MARTIN E. TRUE,
WALLACE M. O'REILLY,
BY
ATTORNEY.

Dec. 26, 1961  M. E. TRUE ET AL  3,014,362
VOLUMETRIC MEASUREMENT OF FLUIDS
Filed April 6, 1959  2 Sheets-Sheet 2
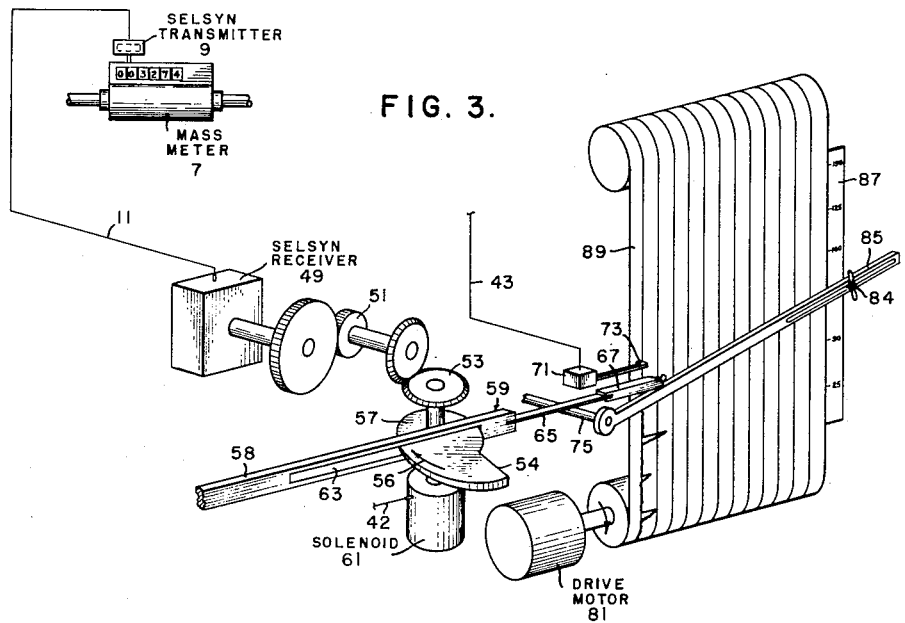
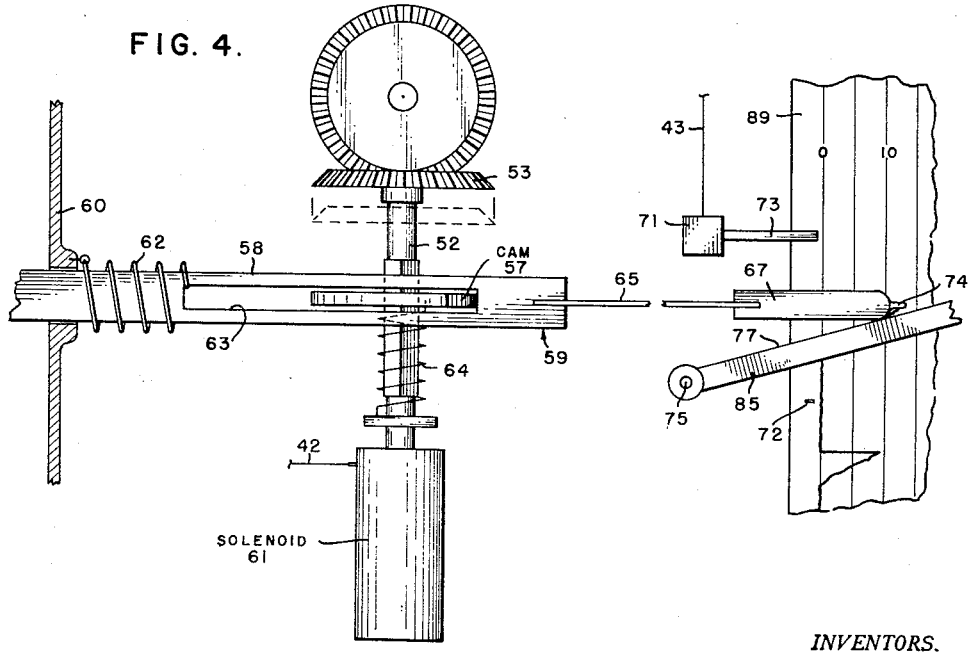
INVENTORS.
MARTIN E. TRUE,
WALLACE. M. O'REILLY,
BY John B. Davidson
ATTORNEY.

United States Patent Office 3,014,362
Patented Dec. 26, 1961

3,014,362
VOLUMETRIC MEASUREMENT OF FLUIDS
Martin E. True, Houston, and Wallace M. O'Reilly, Midland, Tex., assignors, by mesne assignments, to Jersey Production Research Company, Tulsa, Okla., a corporation of Delaware
Filed Apr. 6, 1959, Ser. No. 804,421
8 Claims. (Cl. 73—53)

This invention relates to the measurement of the respective volumes of a mixture of a different fluids passing through a flow line, and more particularly to the measurement of the respective volumes of crude oil and contaminant in a mixture of crude oil and a heavier-than-oil contaminant (usually salt water) flowing or being pumped from a well.

A usual method of determining the amount of crude oil produced from a well is to allow the crude oil and contaminant to flow into a storage tank located near the well, and to gauge the tank to measure the depth of the oil-water interface after the heavier water has settled to the bottom of the tank. The storage tank must be fairly large and is, of necessity, rather expensive to construct and to maintain. Furthermore, the labor cost of daily gauging the tank is substantial. Manifestly, it is desirable to provide a custody transfer system that will automatically measure the amount of crude oil in earth fluids produced from wells.

The present invention makes use of the known fact that the specific gravity of both crude oil and contaminant produced from a given well varies very little, if at all, over long periods of time. According to the teachings of the present invention, a fluid mass meter and a fluid volume meter are connected to a line through which flows all of the liquids produced from a well. The volume meter may be of the type wherein a given unit volume of fluid is repetitively gated through the flow line. Since the mass of the unit volume of crude oil is less than the mass of a similar unit volume of any mixture of the same crude oil and water, the difference between the mass actually measured by the mass meter and the mass of an equal volume of crude oil is functionally related to the percentage of water in the given volume of the mixture. By measuring and recording this difference for each unit volume of fluids gated through the line (the record may be on a strip chart) and correlating each measurement with the specific gravities of crude oil and water, a continuous record may be had of the volume of water (and thus the volume of crude oil) produced by a well.

The invention will be best understood upon consideration of the following description thereof in connection with the accompanying drawings, wherein:

FIG. 3 is an isometric view of an integrating and recording mechanism suitable for use in the embodiment of the invention shown in the system of FIG. 1. The integrating mechanism is shown connected to the selsyn transmitter and mass meter of FIG. 1;

FIG. 4 is an elevational view of a portion of the integating and recording mechanism of FIG. 3.

Figure 1:
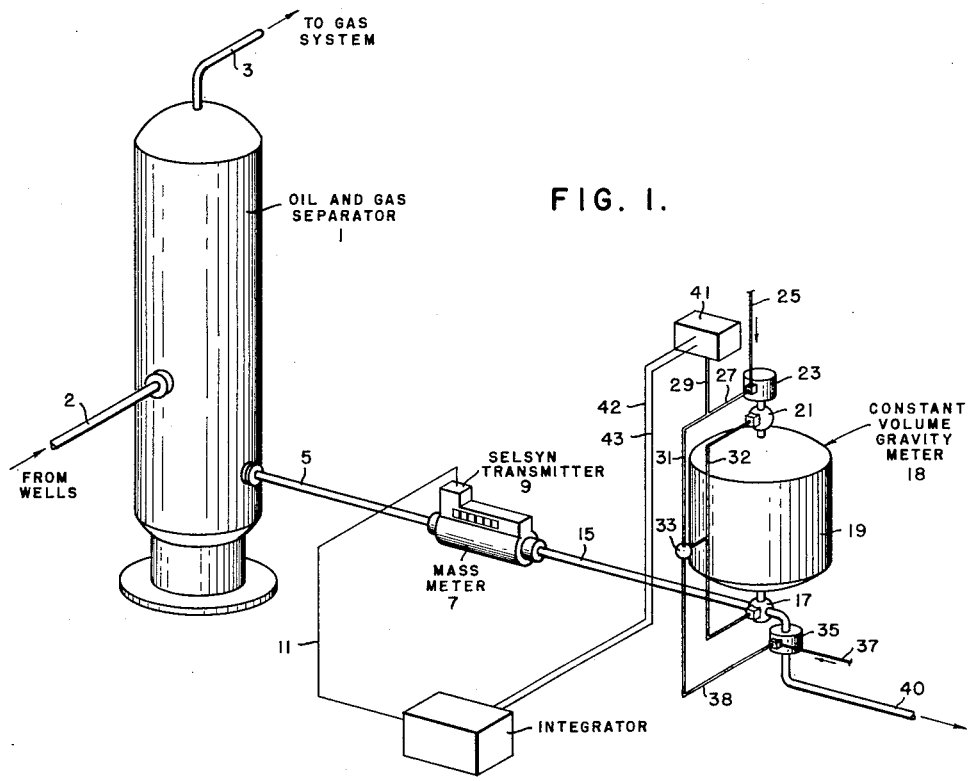
FIG. 1 is a simplified view, partly in block form, of a measuring system in accordance with the present invention.

In FIG. 1 there is shown a line 2 adapted to be connected to a Christmas tree at a wellhead so as to receive well fluids from a producing well. Line 2 is connected to an oil and gas separator 1 of conventional design from which gases are transmitted to a gas transmission system by a pipe 3 and from which liquids are transmitted through a line 5. A fluid mass meter 7 connects line 5 to line 15; mass meter 7 is preferably of the type described in General Electric Instruction Bulletin GEI 66828, and in U.S. Patent No. 2,714,310, Jenning. Briefly described, this particular type of mass meter makes use of a constant speed impeller for imparting to each unit mass of fluid entering the mass meter the same uniform angular velocity of motion. By imparting this angular velocity to the fluid, there is imparted to the fluid leaving the impeller a corresponding angular momentum, and, since the impeller maintains the angular velocity at a constant predetermined value, this angular momentum is directly proportional to the mass of the fluid. After leaving the impeller the fluid enters a turbine and dissipates substantially all of its angular momentum within the turbine. The turbine is angularly movable against the angular restraining force of a spiral spring so that the torque exerted upon the turbine by the fluid angular momentum is dissipated against the sides of the turbine to cause an angular deflection of the turbine that is limited by the spiral spring force. The angular deflection of the turbine is a measure of the mass rate of flow. By time integrating the mass rate of flow, as described in the aforecited General Electric Instruction Bulletin, a continuous output indication is imparted to selsyn transmitter 9 that is indicative of the total mass of fluids transmitted through the mass meter from line 5 to line 15. The output indication transmitted to selsyn transmitter 9 is the number of revolutions of a shaft driven by a totalizing device incorporated in the mass meter.

Referring now to FIG. 3, the output indications of selsyn transmitter 9 are transmitted via transmission line 11 to a suitable selsyn receiver 49. Receiver 49 drives gear train 51, which in turn drives a cam rotating pinion 53. If it is convenient, the output shaft of the mass meter totalizer may be connected directly to the reduction gear train 51.

Pinion 53 drives a motion translating and recording system including cam 57 and stylus 59. The system also includes strip recording chart 89 and stylus deflector 85. Cam 57, which is driven by pinion 53, may be positioned within a slot 63 within stylus arm 58. Arm 58 is biased to the left, as viewed in FIG. 4, by a helical spring 62 connected between the slot 63 and apparatus housing 60. As cam 57 rotates in the direction of arrow 56, the stylus will be driven to the right.

A solenoid 61 is provided which, when energized, pulls shaft 52 downwardly, as viewed in FIG. 4, to disengage pinion 53 from gear train 51. Spring 64 thereupon is effective to rotate cam 57 in the direction opposite to the direction indicated by arrow 56 until cam shoulder 54 abuts against stylus arm 58.

Stylus head 67 is connected to arm 58 by a flexible connecting member 65. Stylus head 67 is provided with a suitable pen means 74 for marking visual indications of stylus travel on strip recording chart 89. The recording head 67 may be deflected upwardly, as viewed in FIG. 4, by a suitable deflecting arm 85 pivotally supported by rod 75. The position of deflecting member 85 is fixed by a clamping means 84 that clamps the deflecting means to a calibrated ratio indicator 87. Strip chart 89 may be driven by a suitable constant speed drive means 81.

The function of the overall apparatus shown in FIGS. 3 and 4 is to record mass indications from mass meter 7 in terms of the percentage of the contaminant (salt water) in each unit volume of fluid gated through the mass meter.

Figure 2:
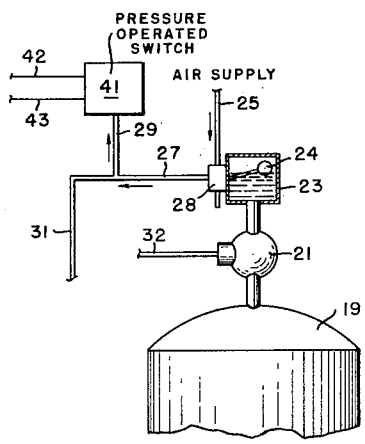
FIG. 2 is a view, partly in cross-section, of a portion of the constant volume gravity meter shown in FIG. 1.

For the purpose of measuring the volume of fluids passing through mass meter 7, there is provided a volume meter 18 (FIG. 1) which is preferably a positive volume fluid meter such as is described in patent application Serial No. 586,964, filed May 24, 1956, by William A. Pitts, and assigned to the assignee of the present invention. The gravity meter functions to repetitively gate uniform volumes of fluid from line 15 to output line 40 and to provide an electrical or mechanical output indication whenever a given volume of fluid is so gated. The gravity meter may comprise a liquid accumulation chamber 19, a three-way gating valve 17, control valves 21 and 33, float-actuated pneumatic control members 23 and 35, and a suitable source of compressed air. Briefly described, the operation of the constant volume gravity meter is as follows. Assume that valve 17 is interconnecting line 15 and chamber 19 and is not interconnecting lines 15 and 40, and that valve 21 interconnects the chamber 19 of ball float pneumatic actuating means 23 to the interior of chamber 19. Valve 33 will be in a position to interconnect lines 31 and 32, and air supply line 25 will be cut off from line 27 by ball float actuated switch 28 (FIG. 2). When chamber 19 is filled, ball float 24 will actuate switch 28 to pressurize lines 27, 29, 31, and 32. Pressure operated switch 41 will close to energize lines 42 and 43. For purposes that will be apparent from the following description, pressurization of line 32 will actuate three-way valve 17 to disconnect the chamber 19 from line 15 and to connect the chamber to line 40. Liquid will flow from the volume meter 18. Pressurization of line 32 will also close valve 21 to keep the float actuator 23 in its actuated position so that pressure will be maintained on lines 27, etc. from supply line 25. When the volume meter is empty, float actuating means 35 will interconnect air line 37 and line 38. Valve 33 will be actuated to disconnect line 31 from line 32. Valve 21 will be opened, liquid from chamber 23 will drop into chamber 19, removing air pressure from lines 27, 29, and 31. Valve 17 will return to its original position, and chamber 19 will again be filled from line 15.

As described above, at the end of a filling cycle of volume meter 18, pressure operated switch 41 is actuated to energize lines 42 and 43. As shown in FIGS. 3 and 4, the line 42 is connected so as to actuate solenoid 61, and line 43 is connected to energize a stylus actuator 71. Upon energization of stylus actuator 71, stylus 73 makes a mark 72 (FIG. 5) on strip chart 89 to indicate that a given volume of fluid has passed through mass meter 7 and volume meter 18.

The shape of the cam surface of cam 57 will be obtained in the following manner. A portion of the cam will be designed to have a constant radius so that the cam will not move the stylus until it has rotated to a position equal to the weight of a barrel of uncontaminated oil, here assuming that the chamber 19 in FIGS. 1 and 2 has a 1-barrel capacity. Thereafter, the radius of the cam will increase so that the cam will drive stylus 59 to the right in a uniform movement directly proportional to the increasing mass of fluid as it is registered through the mass meter 7.

Figure 5:
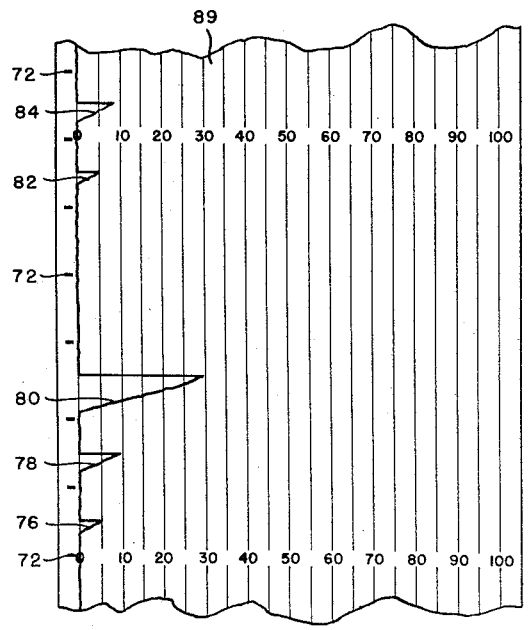
FIG. 5 is a view of a strip chart showing the type of record that may be obtained with the recording apparatus of FIGS. 3 and 4.

Strip chart 89 may be linearly calibrated in terms of percentage of salt water, as shown most perspicuously in FIG. 5. Cam 57 then is most conveniently designed so that stylus 59 is moved to the right, as viewed in FIG. 4, so that the maximum movement of the stylus on each cyclic movement thereof is indicative of the percentage of salt water in the unit volume (barrel) of well fluid being measured.

It is known that the gravity of crude oil at various wells varies considerably; in ordinary installations crude oil gravity varies from 20° API to 50° API. The contaminant produced with the crude oil may be salt water having a weight of between 8.5 and 9.5 pounds per gallon.

The invention provides means connected to the recording means described above for reducing mass recordation with increase in the ratio of the specific gravity of the crude oil to the specific gravity of the contaminant in order to correlate the mass recordation to the percent of contaminant in the fluid produced by a well. The difference quantity recorded as described above thus is reduced in accordance with the ratio of the specific gravity of the contaminant to the specific gravity of oil. To this end, it is necessary to provide positive control over the total lateral movement of stylus pen 74 produced by a given angular rotation of cam 57. This function is accomplished by means of stylus deflecting arm 85. When the stylus head 67 strikes the deflecting arm, it will be deflected upwardly, as viewed in FIG. 4, so that the total lateral displacement of pen 74 will be in proportion to the quantities of oil and water present in the mixture. The position or slope of the stylus deflecting arm 85 determined from the equation $$\frac{(\text{pounds per barrel of water}) - (\text{pounds per barrel of oil})}{100}$$

may be referred to as the "ratio" of these liquids in the mixture. In demonstration, let it be assumed that the specific gravity of the oil in the example is 35° API which will have a corresponding weight of 7.08 pounds per gallon or 297.4 pounds per barrel. The salt water used in this example has a weight of 9.00 pounds per gallon or 378 pounds per barrel. It is to be understood that the assigned weights are to be used only for purposes of explanation and that the liquids may be lighter and/or heavier, as previously stated. In this example, various percentages of a mixture of 35° API crude oil and salt water of 9 pounds per gallon will weigh as follows:

| Percent Oil | Wt. Oil | Percent SW | Wt. SW | Wt. Mixture |
|---|---|---|---|---|
| 100 | 297.40 | 0 | 0 | 297.40 |
| 99 | 295.43 | 1 | 3.78 | 299.21 |
| 98 | 292.45 | 2 | 7.56 | 300.01 |
| 97 | 289.48 | 3 | 11.34 | 300.82 |
| 96 | 286.50 | 4 | 15.12 | 301.63 |
| 95 | 283.53 | 5 | 18.90 | 302.43 |
| 94 | 280.56 | 6 | 22.68 | 303.24 |
| 93 | 277.58 | 7 | 26.46 | 304.04 |
| 92 | 274.61 | 8 | 30.24 | 304.85 |
| 91 | 271.63 | 9 | 34.02 | 305.65 |
| 90 | 268.66 | 10 | 37.80 | 306.46 |
| 80 | 238.92 | 20 | 75.60 | 314.52 |
| 70 | 208.18 | 30 | 113.40 | 321.58 |
| 60 | 178.44 | 40 | 151.20 | 329.64 |
| 50 | 148.70 | 50 | 189.00 | 337.70 |
| 40 | 118.96 | 60 | 226.80 | 344.76 |
| 30 | 89.22 | 70 | 264.60 | 353.82 |
| 20 | 59.48 | 80 | 302.40 | 361.88 |
| 10 | 29.74 | 90 | 340.20 | 369.94 |
| 0 | 0 | 100 | 378.00 | 378.00 |

It may be seen that 378 pounds, the weight of a barrel of salt water, minus 297.4 pounds, the weight of a barrel of oil, is equal to 80.6 pounds. This quantity divided by 100 gives a figure of .806, which is the slope derived for this specific condition. This value would be employed to index the contact edge 77 of the stylus deflecting arm 85.

The operation of the apparatus described above is as follows: Fluid flowing through line 2, the oil and gas separator 1, and line 5, is weighed by the mass meter 7 and flows into volume meter 18. The gravity meter begins filling and the output indication of mass meter 7 is transmitted via selsyn transmitter 9, selsyn receiver 49, gear train 51, gear pinion 53, and shaft 52, to cam 57. The cam rotates but does not move the stylus to the right until a mass of fluid equal to the mass of an equal volume of pure crude oil has passed through mass meter 7. If there is no contaminant in the well fluid, chamber 19 will be filled and the volume meter simultaneously will actuate switch 41 and will dump fluid into outlet line 40. However, if there should be contaminant in the crude oil passing into chamber 19, cam 57 will drive the stylus to the right and a line will be traced on the recording paper 89, as designated by the lines 76, 78, 80, 82, and 84 in FIG. 5. The maximum deflection of the recording pen will be indicative of the percentage of contaminant in the well fluid. When the chamber 19 of the volume meter is filled, the pressure switch 41 will be actuated and electrical signals simultaneously will be transmitted on lines 42 and 43. The signal on line 43 will energize stylus actuator 71 to actuate stylus 73, thereby marking the recording paper to indicate that a unit volume of fluid has been measured. The signal on line 42 will energize solenoid 61 to disengage pinion 53 from gear train 51 so that spring 64 can return the cam to its initial position. The sequence of events will be repeated indefinitely.

Manifestly, the positions of mass meter 7 and constant volume gravity meter 18 may be reversed so that the fluid will pass through the constant volume gravity meter before it passes through the mass meter. Likewise, the pressure operated switch may be placed in communication with air line 38 instead of air line 27 so that the marks produced upon actuation of the switch will be indicative of the beginning of a filling cycle rather than the end of a filling cycle of the volume meter. Other modifications may be made in the system without departing from the spirit and scope of the invention, and it is therefore desired to limit the invention only by the following claims:

We claim:

1. Apparatus for determining the contaminant of a fluid in a flow line containing a desired fluid and a contaminant, comprising: recording means including a constant speed recording paper transport mechanism, a recording stylus in cooperating relationship therewith, an actuating arm for said stylus adapted to move said stylus transversely across the recording paper from a reference position thereon, said arm having a flexible section adapted to permit at least limited movement in the line of movement of the recording paper; a deflecting rod adjustably positioned across the recording paper to deflect said stylus longitudinally in the line of movement of the recording paper as said stylus moves transversely across the recording paper; a constant volume flowmeter in said line adapted to cyclically gate equal volumes of fluids flowing through said line and to produce an output signal at a predetermined instant in each cycle; a mass flowmeter in said line for determination of weights of fluids flowing through said line; integrator means coupled to said mass flowmeter adapted to integrate output indications from said mass flowmeter to produce an output indication indicative of total mass of fluids passing through said mass flowmeter; a cam driven in accordance with the output indication of said integrator adapted to drive said actuating arm for movement of said stylus across the recording paper; and means coupled to said cam adapted to reset said cam to a reference position thereof responsive to each output signal from said constant volume flowmeter.

2. Apparatus for determining the contaminant of a fluid in a flow line containing a desired fluid and a contaminant, comprising: recording means including a constant speed recording paper transport mechanism, a recording stylus in cooperating relationship therewith, an actuating arm for said stylus adapted to move said stylus transversely across the recording paper from a reference position thereon, said arm having a flexible section adapted to permit at least limited movement in the line of movement of the recording paper; a deflecting rod adjustably positioned across the recording paper to deflect said stylus longitudinally in the line of movement of the recording paper as said stylus moves transversely across the recording paper; a constant volume flowmeter in said line adapted to cyclically gate equal volumes of fluids flowing through said line and to produce an output signal at a predetermined instant in each cycle, a mass flowmeter in said line for measuring the weights of fluids which pass through said line; integrator means coupled to said mass flowmeter adapted to integrate output indications from said mass flowmeter to produce an output indication indicative of total mass of fluids passing through said mass flowmeter; a cam driven in accordance with the output indication of said integrator adapted to drive said actuating arm for movement of said stylus across the recording paper; and means coupled to said cam adapted to reset said cam to a reference position thereof responsive to each output signal from said constant volume flowmeter; said cam being angularly adjustable to begin transverse movement of said actuating arm at selected mass output indications of said integrator.

3. Apparatus for determining the contaminant of a fluid in a flow line containing a desired fluid and a contaminant, comprising: recording means including a constant speed recording paper transport mechanism, a recording stylus in cooperating relationship therewith, an actuating arm for said stylus adapted to move said stylus transversely across the recording paper from a reference position thereon, said arm having a flexible section adapted to permit at least limited movement in the line of movement of the recording paper; a deflecting rod adjustably positioned across the recording paper to deflect said stylus longitudinally in the line of movement of the recording paper as said stylus moves transversely across the recording paper; a constant volume flowmeter in said line adapted to cyclically gate equal volumes of fluids flowing through said line and to produce an output signal at a predetermined instant in each cycle; a mass flowmeter in said line for measuring the weights of fluids which pass through said line; integrator means coupled to said mass flowmeter adapted to integrate output indications from said mass flowmeter to produce an output indication indicative of total mass of fluids passing through said mass flowmeter; a cam driven in accordance with the output indication of said integrator adapted to drive said actuating arm for movement of said stylus across the recording paper; and a solenoid actuated reset means responsive to said output signal from said constant volume flowmeter to reset said cam, actuating arm and integrator to reference positions thereof.

4. Apparatus for determining the contaminant of a fluid in a flow line containing a desired fluid and a contaminant, comprising: recording means including a constant speed recording paper transport mechanism, a recording stylus in cooperating relationship therewith, an actuating arm for said stylus adapted to move said stylus transversely across the recording paper from a reference position thereon, said arm having a flexible section adapted to permit at least limited movement in the line of movement of the recording paper; a deflecting rod adjustably positioned across the recording paper to deflect said stylus longitudinally in the line of movement of the recording paper as said stylus moves transversely across the recording paper; gating means for gating equal volumes of fluids through said line and for producing an output signal between the flow of successive equal volumes of fluids; a mass flowmeter in said line for measuring the weights of fluids which pass through said line; integrator means coupled to said mass flowmeter adapted to integrate output indications from said mass flowmeter to produce an output indication indicative of total mass of fluids which pass through said mass flowmeter; a cam driven in accordance with the output indication of said integrator adapted to drive said actuating arm for movement of said stylus across the recording paper; and means coupled to said cam adapted to reset said cam to a reference position thereof responsive to each output signal from said gating means.

5. Apparatus for determining the degree of contamination of a fluid in a flow line containing a desired fluid and a contaminant, comprising: first means hydraulically coupled to said line for repetitively and cyclically measuring the cumulative mass of a given volume of fluid passing through said line and for providing a first signal indicative of a predetermined event in each cycle and a second signal indicative of the cumulative mass of the fluids passing through the flow line during each cycle; recording means coupled to said first means responsive to said second signal to record the excess in the mass of each given volume over the mass of a volume of uncontaminated desired fluid equal to one of said given volumes; said first means including means coupled to said recording means responsive to each of said first signals to reset said recording means to a reference position thereof preparatory to recording of the mass of the next volume of fluid passing through said line; and means connected to said recording means for reducing the mass recordation in accordance with the ratio of specific gravity of the desired fluid to the specific gravity of the contaminant.

6. Apparatus for determining the degree of contamination of fluid in a flow line containing a desired fluid and a contaminant, comprising: first means hydraulically coupled to said flow line for cumulatively measuring the mass of fluids passing through said line and producing an output signal indicative of the measurement; second means hydraulically coupled to said flow line adapted to gate the fluid passing through said flow line so as to send discrete, equal volumes of fluid therethrough and to generate a signal between the passage of successive discrete, equal volumes of fluid; and third means coupled to said first and second means and responsive to the output signals produced by said first and second means adapted to compute the difference between the mass of each discrete, equal volume of fluid passing through the flow line and the mass of an equal volume of the desired fluid, and to reduce the difference quantity in accordance with the ratio of the specific gravity of the contaminant to the specific gravity of the desired fluid to obtain an output indication of the volume of contaminant in each equal volume of fluid passing through said line.

7. Apparatus for determining the degree of contamination of a fluid in a flow line containing a desired fluid and a contaminant, comprising: first means hydraulically coupled to said flow line for cumulatively measuring the mass of fluids passing through said line and producing an output signal indicative of the measurement; second means hydraulically coupled to said flow line adapted to measure and to produce an output signal indicative of the volume of fluid passing through said line; means coupled to said first means and to said second means adapted to derive an output indication of the difference between the mass of fluid passing through the line and the mass of an equal volume of desired fluid; and means for reducing said output indication in accordance with the ratio of the specific gravity of the desired fluid to the specific gravity of the contaminant.

8. Apparatus for determining the degree of contamination of a fluid in a flow line, said fluid containing a desired fluid and a contaminant having known specific gravities, said apparatus comprising: first means hydraulically coupled to the flow line adapted to derive a first output indication indicative of the volume of fluid flowing through the line and a second output indication indicative of the mass of the volume of fluid; second means coupled to said first means responsive to said first and second indications to derive an output indication of the difference between the mass of the total fluid passing through the line and the mass of an equal volume of the desired fluid; and means in operative relationship with said second means for reducing said output indication in accordance with the ratio of the specific gravity of said desired fluid to the specific gravity of said contaminant.

References Cited in the file of this patent

UNITED STATES PATENTS

| 2,572,436 | Boucher et al. | Oct. 23, 1951 |
| 2,617,299 | Ennis et al. | Nov. 11, 1952 |
| 2,920,483 | Hebard et al. | Jan. 12, 1960 |

OTHER REFERENCES

Article entitled: "Mass Flowmeters With Retarding Disk Integration," by Bailard et al., May 1957, pages 127–129. (Copy in Div. 36.)